Aug. 17, 1965    R. S. MORROW ETAL    3,201,776
CONTINUOUS VIBRATION MONITOR DEVICE
Filed April 24, 1963    3 Sheets-Sheet 1

INVENTORS
ROBERT S. MORROW &
BY GLEN H. THOMAS
Harry B. Keck
ATTORNEY

Aug. 17, 1965        R. S. MORROW ETAL        3,201,776
            CONTINUOUS VIBRATION MONITOR DEVICE
Filed April 24, 1963                        3 Sheets-Sheet 3

INVENTORS
ROBERT S. MORROW &
GLEN H. THOMAS
BY
         Harry B. Keck
              ATTORNEY

United States Patent Office 3,201,776
Patented Aug. 17, 1965

3,201,776
CONTINUOUS VIBRATION MONITOR DEVICE
Robert S. Morrow, Worthington, and Glen H. Thomas, Columbus, Ohio, assignors to International Research and Development Corporation, Worthington, Ohio, a corporation of Ohio
Filed Apr. 24, 1963, Ser. No. 275,423
3 Claims. (Cl. 340—261)

This invention relates to a vibration monitor device adapted to observe the vibration level of rotating machinery under continuous operating conditions and also under intermittent operating conditions.

Vibration of rotating machinery is manifested at the bearings and the housing in which the rotating elements are supported. Vibrations may originate from a variety of sources, e.g., lack of concentricity of the rotating element; loose or worn bearings in which the rotating element is turning; misalignment of the shaft on which the rotating element is turning; et cetera. Continued rotation of such elements under severe unbalance conditions results in accelerated wear frequently concluding in permanent damage to the machinery. Nevertheless, all rotating machinery exhibits measurable manifestations of unbalance. For each individual rotating element, it is possible to determine a maximum allowable vibration level above which the machine should be investigated to assess the source of the excessive vibrations.

Frequently rotating machinery is subjected to transient shocks of brief duration, for example, when tools are dropped by workmen against the housing of the machine, or when heavy carts move past the machinery installation. Such transient shocks are manifested by excessive vibrations of the housing of transient duration. These transient vibrations are totally unrelated to unbalance conditions within the rotating elements and should be ignored by monitor devices which are intended to review only those vibrations which are of a continuous character.

With large, expensive rotating machinery such as electrical dynamos and steam turbines, continuous monitoring of the expensive rotating elements is desirable so that the initial evidences of bearing wear, for example, can be detected to allow for replacement of such worn parts before damage to the entire machinery develops. The present monitor device will provide instantaneous indications of excessive vibration so long as the monitor device is operating. In addition, the present monitor device contains some built-in features which will indicate affirmatively when the device is actually operating within the correct detection range.

Frequently where numerous rotating machines are installed in a large area, it is desirable to maintain the vibration monitor devices collectively in a designated control zone which is geographically remote from some or all of the machinery.

The present invention provides a vibration monitor device which satisfies these requirements. The present vibration monitor device is utilized in combination with a mechanical transducer which is adapted to convert mechanical vibrations into corresponding electrical signals which are introduced into the monitor device. Such transducers preferably are of the velocity-responsive type, as, for example, that type described in U.S. Patent 2,754,435.

The present monitor device electronically integrates the velocity-responsive electrical signal to produce a resultant electrical signal which is responsive to the actual displacement (or "shake") of the housing. So long as the amplitude of the displacement signal remains above a predetermined minimum value, an indicator lamp on the monitor device remains continuously glowing. A green lamp is preferred for this indicator lamp. So long as the green lamp is continuously glowing, the monitor device is in operable condition and the rotating machinery under observation is operating satisfactorily. When the green light commences to flash intermittently instead of remaining continuously glowing, some difficulty in the system is indicated. The nature of the difficulty will be hereinafter more fully described.

In addition there is provided an alarm lamp, preferably a red lamp. When the vibration level of the rotating machinery is satisfactory, the red lamp remains extinguished and the green lamp will glow continuously. In the event the vibrations exceed a predetermined selected value for an appreciable period (e.g., the appreciable period can be selected preferably within the range of from 3 to 10 seconds), the red lamp will commence flashing intermittently. By means of suitable relays, additional alarm indications may be presented, as, for example, audible horns, remote lamps, or even machinery shut-down switches.

The alarm lamp may be assembled in alternative ways, i.e., (a) with an automatic reset or (b) with a manual reset device. Under the automatic reset option, the red lamp will become extinguished instantly when the vibration level diminishes below the predetermined selected value. Under the manual reset option, the red lamp will continue to glow after it has been actuated regardless of the level of vibration which is thereafter manifested. The red lamp will continue to glow until the alarm circuit is manually reset. If, after the alarm circuit has been manually reset, the vibration level remains at an excessive level, the red lamp will commence glowing once more.

Thus the objects of this invention include providing vibration monitor device which is adapted:

(1) to indicate excessive vibration levels in rotating machinery;

(2) to ignore brief transient vibrations of excessive vibration levels yet to respond instantly to continuing vibration levels extending over a predetermined time period, e.g., for a time period within the range of from about 3 to about 10 seconds;

(3) to indicate at all times through a fail-safe circuit and indicator whether the rotating machinery is operating and also whether the monitor is operating;

(4) to provide alternatively for (a) automatic reset of the alarm circuit after the alarm circuit has been actuated and after the vibration level subsequently has diminished below the predetermined selected allowable vibration level; or for (b) manual reset of the alarm circuit whereby the alarm indication will continue to be presented after the alarm circuit has been actuated until manually reset regardless of the existing level of vibration subsequently manifested;

(5) to provide a metered indication of the instantaneous vibration level of rotating machinery over a relatively wide range of vibrational frequencies whereby the indication aids in the predetermination and preselection of the threshold vibration levels to which the alarm circuit responds;

(6) to provide means for varying the alarm-indicating vibration level according to the unique needs of each installation;

(7) to operate on direct current at the customarily available potentials of 12 volts, 24 volts or 48 volts, and in addition, if desired, to operate on the customarily available 110-volt, 60-cycle alternating current source;

(8) to comprise transistorized circuitry which is remarkably compact and relatively rugged in service, requiring very little servicing or maintenance attention;

(9) to provide an emergency indication of the existing vibration level of rotating machinery in the absence of a vibration meter.

These and other objects and advantages will become apparent from the following detailed description which refers to the accompanying drawings in which:

FIGURES 5 and 6 can be aligned and represented as a single assembly.

FIGURE 1

Figure 1:
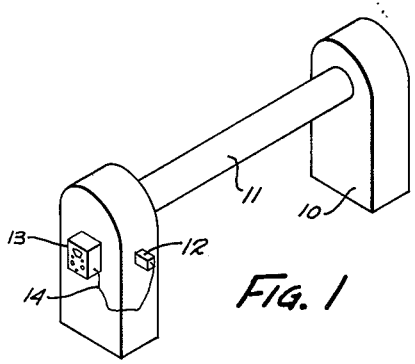
FIGURE 1 is a perspective illustration of machinery having rotating elements to which the present vibration monitor device is attached along with a mechanical transducer.

There is illustrated in FIGURE 1 a stylized machine 10 having rotating elements such as a rotor 11. A mechanical transducer 12 is secured to the housing or to a bearing mount of the machine 10. The present vibration monitor device is shown as a box-like structure 13 which is connected by an electrical cable 14 to the transducer 12. The present vibration monitor device is shown as being mounted on the machine 10, although it is understood that the box-like structure 13 could be located remotely from the machine by extending the cable 14 from the transducer 12 to the remote location.

FIGURE 2

Figure 2:
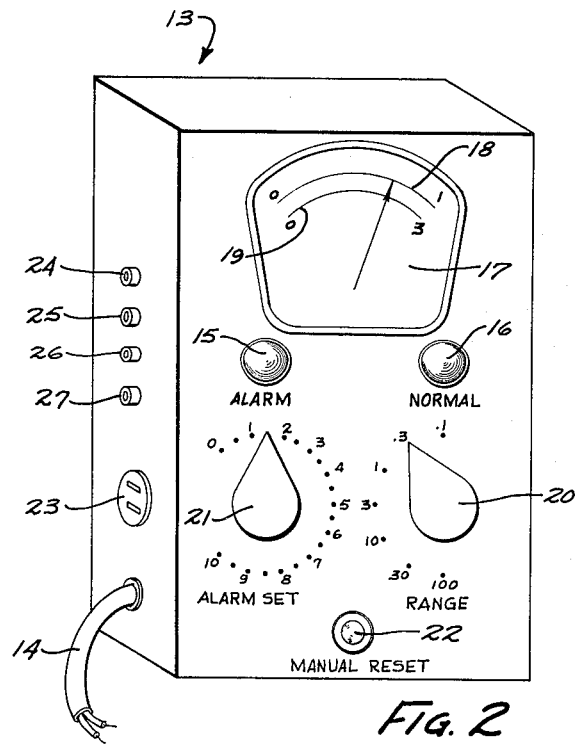
FIGURE 2 is a perspective illustration of the present vibration monitor device in a preferred embodiment illustrating the compact assembly which has been achieved.

A preferred embodiment of the present vibration monitor device is illustrated in FIGURE 2 as a small box-like structure 13. The electrical cable 14 extends to a suitable jack on a side plate of the device. A red lamp 15 hereinafter referred to as the alarm lamp is provided in a suitable socket on the face of the device. A green lamp 16 hereinafter referred to as the fail-safe lamp is provided in a suitable socket on the face of the device.

A D.C. voltmeter 17 preferably is provided on the face of the device. The meter 17 normally has two corresponding scales 18, 19 over the ranges of zero-to-one and zero-to-three, respectively.

A displacement range potentiometer selector knob 20 is provided on the face of the device and possesses calibrated stop-positions corresponding to meter range multiplier factors.

An alarm set knob 21 is provided on the face of the device and possesses numeral indicators for selecting the magnitude of vibration (related to the selected range of the knob 20) at which the alarm lamp 15 should be flashed, i.e., the alarm threshold vibration level.

A manual reset button 22 may be provided on the face of the device to allow for reset of the alarm circuitry and extinguishing of the red alarm lamp 15 as herein described. The manual reset button 22 may be provided at a distance from the box 13, e.g., in a remote control room.

A socket 23 is provided on a side plate of the device for introducing 110-volt, 60-cycle, alternating power supply if desired. Direct current power supplies may be introduced to the selected one of three input jacks 24, 25, 26 and ground jack 27, whereby the power source for the vibration monitor device may be selected.

FIGURE 3

Figure 3:
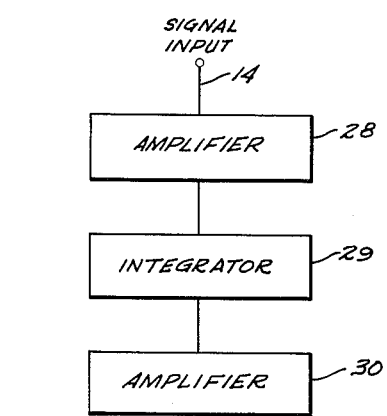
FIGURE 3 is a schematic illustration of the essential circuitry which is embodied in the present vibration monitor device.

The interior of the vibration monitor structure 13 contains electronic circuitry as schematically illustrated in FIGURE 3. The input signal is an alternating electrical signal derived from the transducer (FIGURE 1) related to the velocity of movement of the vibrating machinery under scrutiny. The input signal is introduced through the cable 14 to an amplifier stage 28. The amplified signal is integrated in an integrator stage 29 to convert the velocity-responsive input signal to a displacement-responsive counterpart signal. That integrated signal is further amplified in an amplifier stage 30. The resultant signal is delivered to three signal channels comprising an alarm and relay stage 31; to a fail-safe and relay stage 32; and to a meter amplifier stage 33 where a meter 17 may be provided with the device. The alarm and relay stage 31 controls the illumination of the alarm lamp 15. The fail-safe and relay stage 32 controls the illumination of the fail-safe lamp 16. The meter amplifier stage 33 regulates the indications of the displacement meter 17.

FIGURE 4

Figure 4:
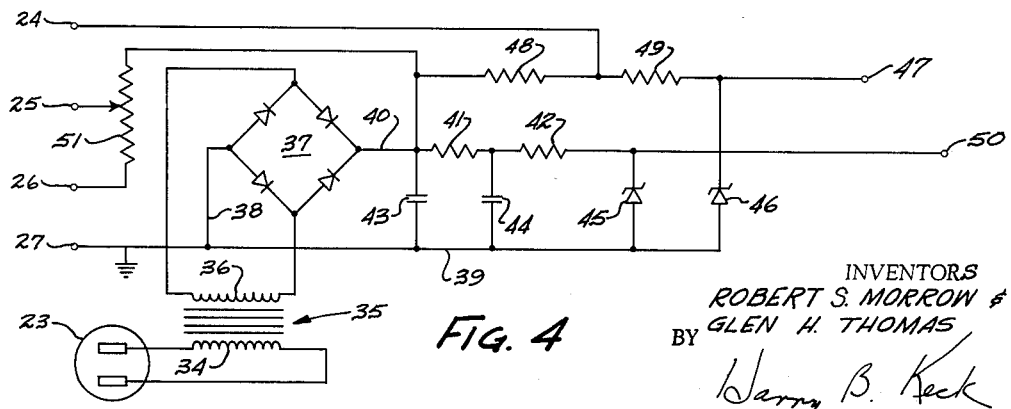
FIGURE 4 is a schematic illustration of a preferred power supply for the present vibration monitor device providing for two separate outputs and adapted to A.C. or D.C. power source.

FIGURE 4 illustrates specific circuitry for the power supply.

Referring firstly to the power supply stage of FIGURE 4, the jacks 24, 25, 26, 27 correspond to those shown on the side of the monitor structure 13 in FIGURE 2. A twelve-volt direct current supply, if available, is applied between the terminals 24, 27. A twenty-four volt direct current supply, if available, is applied between the terminals 25, 27. A forty-eight volt direct current supply, if available, is applied between the terminals 26, 27. Alternating current line voltage supply, if available, may be introduced through the socket 23 and applied to the primary coil 34 of a power transformer 35. A secondary coil 36 of the transformer 35 is connected to a rectifier bridge 37 having four diodes. One terminal of the rectifier bridge 37 is connected through a conductor 38 to a ground conductor 39. The remaining bridge terminal is connected to a filter circuit through a conductor 40. The filter circuit includes resistors 41, 42, capacitors 43, 44 and two zener-diodes 45, 46. A direct current power supply capable of developing substantial current is available through an output terminal 47. Regulation resistors 48, 49 are connected in series with the conductor 40 and deliver a regulated voltage source through the zener diode 46 to an output terminal 47. A tapped regulation resistor 51 serves to accommodate 24-volt or 48-volt power supplies for use in the device.

Regulation of the power supply at the terminal 47 is preferably about 9 volts±5 percent. The terminal 47 provides power for a widely varying load of lamps and relays.

A closely regulated power supply is available at the terminal 50 at 9 volts±about 1–2 volts deviation.

FIGURE 5

Figure 5:
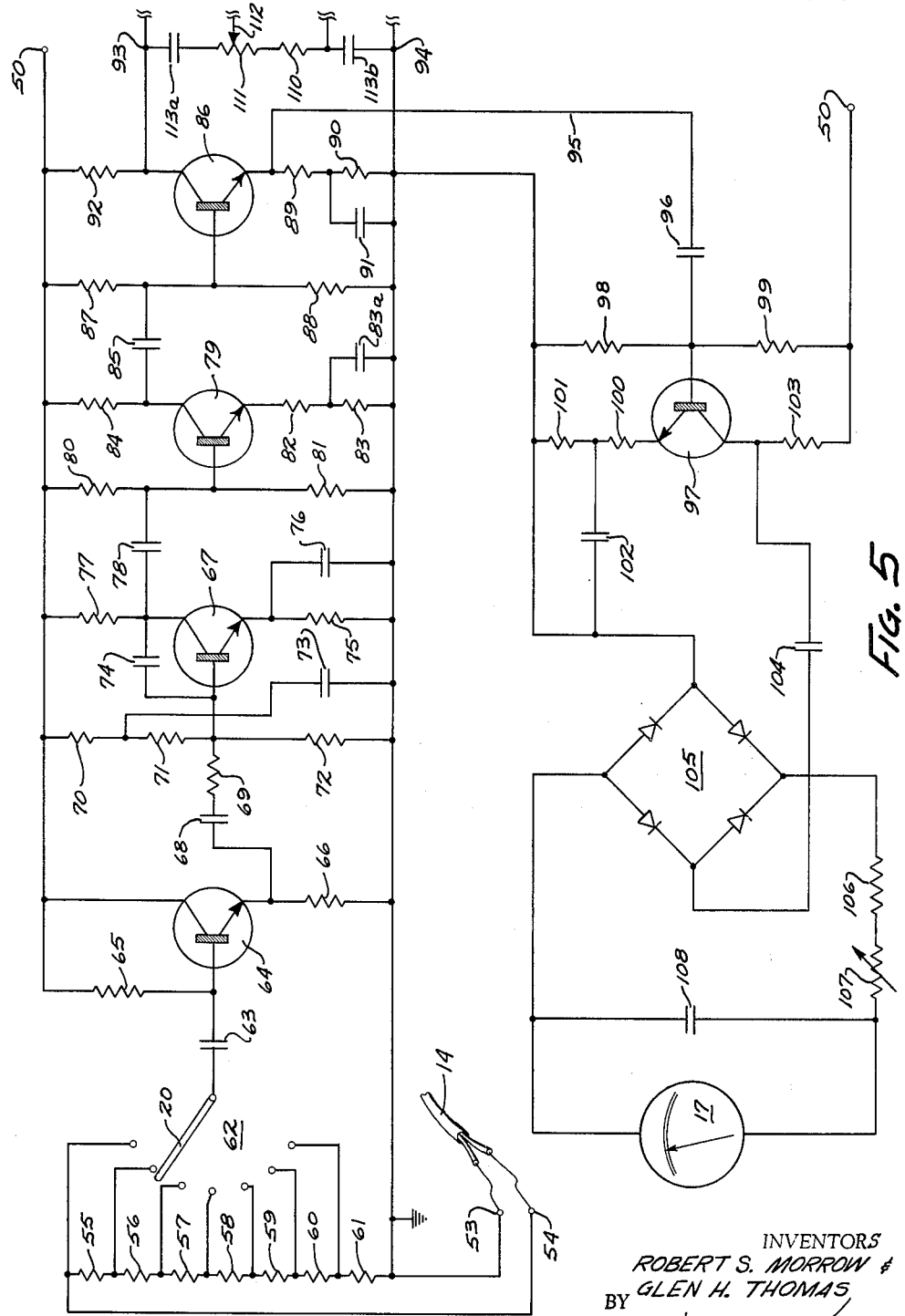
FIGURE 5 is a schematic illustration of amplification and integration stages and the meter circuitry which has been illustrated in FIGURE 3.
Figure 6:
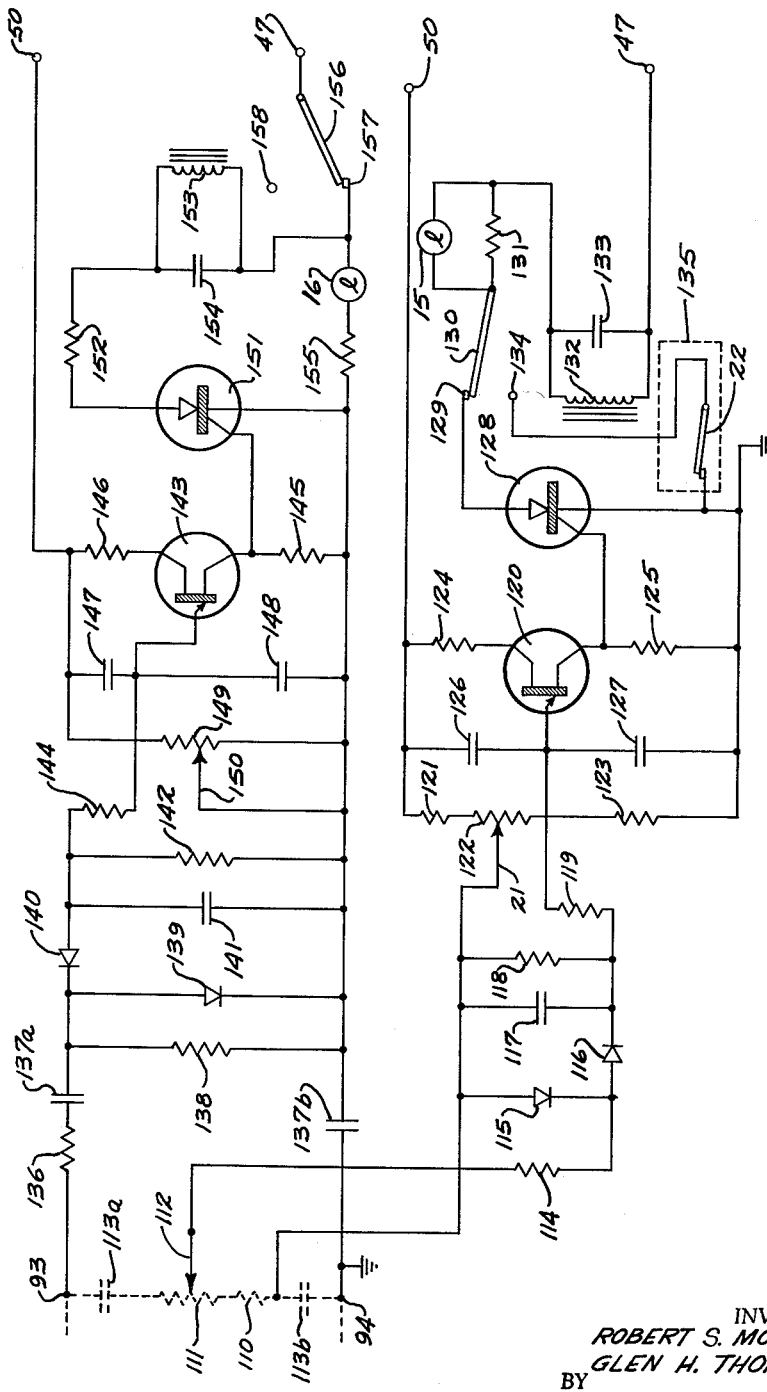
FIGURE 6 is a schematic illustration of the alarm circuitry and the fail-safe circuitry which has been illustrated in FIGURE 3. Note.

The specific circuitry corresponding to the schematic illustration of FIGURE 3 is illustrated in FIGURES 5 and 6.

The upper portion of FIGURE 5 illustrates the amplifier stage 28, the integrator stage 29 and the amplifier stage 30 in an arrangement which is somewhat conventional in electronic vibration analysis apparatus.

The input signal is applied through two terminals 53, 54 which are associated with the transducer cable 14. The signal is delivered through one or more attenuation resistors 55, 56, 57, 58, 59, 60, 61 to a switch 62 having a swing-arm 20 for selecting the range of sensitivity of the remaining circuitry. The swing-arm 20 corresponds to the knob 20 shown in FIGURE 2. The selected signal is coupled through a capacitor 63 to the base of a common collector amplifier 64 having high input impedance and low output impedance. The base of amplifier 64 is biased through resistor 65. The emitter signal is delivered to an emitter load resistor 66 and coupled to the base of a common emitter integrator 67 through a coupling capacitor 68 and an emitter resistor 69. The base of the integrator 67 is biased through resistors 70, 71, 72. A filtering capacitor 73 is provided to protect the integrator 67 from transients and circuit noise. The signal integration is achieved through an integration capacitor 74 which is carefully selected to close tolerance, less than ±1 percent deviation being preferred. A feedback resistor 75 connects the emitter of the integrator 67 to ground. A by-pass capacitor 76 parallels the feedback resistor 75. The output of the integrator 67 is delivered to a collector resistor 77 and also coupled through a coupling capacitor 78 to the base of a common emitter voltage amplifier 79. The base of the amplifier 79 is biased through resistors 80, 81. The emitter of the amplifier 79 is connected to ground through an A.C. and D.C. feedback resistor 82 and also a D.C. feedback resistor 83 which is paralleled with a by-pass capacitor 83a. The collector of the amplifier 79 delivers its output through a collector load resistor 84. The output signal is coupled through a capacitor 85 to the base of a second common emitter voltage amplifier 86. The base of the amplifier 86 is biased through resistors 87, 88. The emitter of the amplifier 86 is connected to ground through an A.C. and D.C. feedback resistor 89 and also through a D.C. feedback resistor 90 which is paralleled with a by-pass capacitor 91. The output of the second amplifier 86 is delivered through a collector load resistor 92 and delivered to terminals 93, 94 (ground) for further use in the system.

It will be observed that the output of the upper portion of the circuitry illustrated in FIGURE 5 (i.e., as applied to the terminals 93, 94) is an amplified, integrated signal corresponding to the input signal which is presented at the terminals 53, 54. The terminals 93, 94 are associated with the alarm and relay circuitry 31 and the fail-safe and relay circuitry 32 which appear in FIGURE 6.

The meter amplifier and meter are illustrated in the bottom portion of FIGURE 5. The input signal for the meter amplifier is drawn from the emitter of the amplifier 86 through conductor 95 and coupled through a capacitor 96 to the base of a common emitter amplifier 97. The base of the amplifier 97 is biased to ground potential through resistor 98 and biased to the regulated power supply terminal 50 (see FIGURE 4) through resistor 99. The emitter of the amplifier 97 is connected to ground through an A.C. and D.C. feedback resistor 100 and also through a D.C. feedback resistor 101 which is paralleled by a by-pass capacitor 102. The output of the amplifier 97 is delivered through a collector load resistor 103 and also is coupled through a capacitor 104 to the terminals of a bridge rectifier 105 containing four diodes. The output of the bridge rectifier 105 is applied through resistors 106, 107 to a D.C. voltmeter 17 which corresponds to the meter 17 shown on the face of the device in FIGURE 2. The function of the resistor 106 is to place the output signal from the bridge rectifier 105 in the proper range to allow for fine adjustment of a variable resistor 107. A damping capacitor 108 is provided across the terminals of the D.C. voltmeter 17.

Thus the function of the meter circuitry in the bottom portion of FIGURE 5 is merely to amplify the output signal from the upper portion of FIGURE 5, rectify the amplified signal and indicate the magnitude of that signal visually on the meter 17.

The swing-arm 20 of FIGURE 5 is adjusted to select the proper amount of attenuation resistance needed for placing the indication of the meter 17 on the proper range. The variable resistor 107 normally is pre-set at the factory.

FIGURE 6

The lower portion of FIGURE 6 illustrates the alarm and relay circuitry; the upper portion FIGURE 6 illustrates the fail-safe and relay circuitry.

Both circuits draw a 9-volt regulated power supply through the terminals 50 and a 9-volt power supply for relay and lamp operation through the terminals 47.

The input signal for both circuits is applied across the terminals 93, 94. The input signal is applied through alarm-set relay resistor 110, potentiometer 111 and coupling capacitors 113a, 113b. The poteniometer 111 has a variable tap 112. The function of the resistor 110 is to determine the range of the potentiometer 111. Adjustment of potentiometer 111 through the tap 112 determines the alarm gain control as will hereinafter be more fully described.

The input signal for the alarm and relay circuit is delivered through an isolation resistor 114 to a rectifier-filter circuit including a pair of detector diodes 115, 116, a detector filter capacitor 117 and a detector load resistor 118. Thus a D.C. potential is applied across the detector load resistor 118. That D.C. potential is connected through an isolation resistor 119 to the emitter of a voltage sensing unijunction transistor 120 and also is connected to a voltage divider which comprises resistors 121, 123 and potentiometer 122. A variable tap 21 of the potentiometer 122 corresponds to the alarm set knob 21 shown in FIGURE 2. The tap 21 determines the threshold level of vibration of the machine under scrutiny which will present an alarm indication from the monitor device. The tap 21 provides a linear scale for adjustment of the alarm threshold level. The ouptut of the unijunction transistor 120 is delivered through a Base-2 load resistor 124 and through a Base-1 load resistor 125. The output is supplied by energy stored in a pair of pulse discharge capacitors 126, 127. The Base-1 signal is delivered to the gate of a silicon-controlled rectifier (SCR) in the manner of a thyratron. The SCR 128 serves as a circuit opening in a relay circuit hereafter described until it becomes short-ciruited by the application of a threshold potential to the gate. The relay circuit includes the anode and cathode of the SCR 128, a relay contact terminal 129, a relay arm 130, the alarm signal lamp 15 in parallel with a protective resistor 131, a relay coil 132 in parallel with a delay capacitor 133 and the 9 volt power supply terminal 47.

The relay coil 132, when charged through the capacitor 133, attracts the relay arm 130 away from the relay contact terminal 129 to engagement with a contact terminal 134, thereby interrupting the relay circuit.

Where manual reset operation is desired, the contact terminal 134 may be connected through a normally open manual reset switch 135 to ground. The switch arm 22 of the manual reset switch 135 corresponds with the manual reset button 22 shown in FIGURE 2.

Fail-safe and relay circuit

The fail-safe and relay circuit of FIGURE 6 derives its input signal from the terminals 93, 94. The input signal is delivered through an isolation resistor 136 and coupled through capacitors 137a, 137b to a rectifier-filter circuit which includes a pair of detector diodes 139, 140, a filter capacitor 141, and a D.C. return resistor 138. The rectified, filtered signal is delivered across a detector load resistor 142. The signal is connected to the emitter of a voltage sensing unijunction transistor 143 through an isolation resistor 144. The output of the unijunction transistor 143 is delivered through a Base-2 load resistor 145 and a Base-1 load resistor 146. The output is supplied by energy stored in a pair of pulse discharge capacitors 147, 148. A voltage divider is provided across the discharge capacitors 147, 148 comprising a resistor 149 having a variable tap 150.

The output of the unijunction transistor 143 is delivered to the gate of a silicon-controlled rectifier (SCR) 151 which functions in the manner of a thyratron. The SCR 151, when conducting, comprises a portion of the fail-safe relay circuit which includes the anode of the SCR 151, a load limiting resistor 152, a relay coil 153 in parallel with a timing capacitor 154, the fail-safe signal lamp 16 and a bulb-protecting resistor 155 to ground and thence to the cathode of the SCR 151. A 9-volt power supply from the terminal 47 is connected to a relay switch arm 156 which is normally in engagement with a relay contact terminal 157, thereby providing a normally closed path including the fail-safe signal lamp 16 which is then normally glowing. When the timing capacitor 154 is charged, the potential across the relay coil 153 causes the relay switch arm 156 to move toward an open contact terminal 158, thereby breaking the path from the 9-volt supply terminal 47 to the fail-safe signal lamp 16.

Operation

The signal applied to the terminal 93, 94 as heretofore described, represents an electrical counterpart of the actual displacement of the vibrating machinery which is under scrutiny. So long as the machinery is rotating, some vibrations will be manifested and an alternating electrical signal of appreciable amplitude will be presented across the terminals 93, 94. Note that the voltage amplifier 86 (FIGURE 5) has a dual output. The collector of the amplifier transistor 86 drives the fail-safe and alarm circuits of FIGURE 6 across the terminals 93, 94. The emitter of the amplifier transistor 86 drives the meter circuit of FIGURE 5.

The various settings of the displacement range potentiometer switch 20 (FIGURES 2 and 5) serve to alter the sensitivity of the device to accommodate actual rotor displacements from a meter (17) range of zero-to-100-micro-inches as one extreme to a range of zero-to-100-mils as the other extreme.

Alarm circuit and relay

The actual vibration displacement of the rotor under scrutiny is related to the amplitude of the signal applied at terminals 93, 94 (FIGURES 5 and 6). That signal is corrected to a corresponding direct current voltage across the detector load resistor 118. That voltage is applied to the voltage sensing transistor 120 which also has applied the voltage from the voltage divider resistors 121, 122, 123. The ratio of the applied voltages is determined by the setting of the tap for the variable resistor 122. If the voltage applied through resistor 119 exceeds a predetermined value (according to the setting of the tap 21 of the variable resistor 122), the transistor 120 commences oscillation and generates a series of pulses through the Base-1 load resistor 125. In a typical installation, the pulses are of 3.0 volts amplitude and 2 micro-seconds duration, reoccurring every 540 micro-seconds. The pulses are directly applied to the gate of the SCR 128. The initial pulse will fire the SCR 128 and conduction will continue through the anode circuit until the switch arm 130 is disengaged from the contact terminal 129, i.e. when the coil 132 is energized. The time delay capacitor 133 requires a predetermined charging period to reach its rated voltage which will energize the relay coil 132. In a typical installation, the rated voltage of the delay capacitor 133 is 6 volts and 100 milli-seconds are required to develop a 6-volt charge. When the switch-arm 130 disengages from the contact terminal 129, the relay circuit is broken and conduction ceases through the SCR 128. Thus the alarm signal lamp 15 is extinguished and the coil 132 is de-energized, allowing the switch arm 130 to return into its normal engagement with the contact terminal 129. If a pulse (or train of pulses) is presented across the Base-1 load resistor 125, the SCR 128 will fire once again and the alarm signal lamp 15 will be lighted, only to extinguish once again after the relay coil 132 becomes energized. Thus the alarm signal lamp 15 will flash intermittently so long as the vibrations under observation exceed the preselected level. When the vibrations are less than the preselected level, the alarm lamp 15 will thereafter remain extinguished. The frequency of the intermittent flashing is determined by the constants of the various delay capacitors and relays in the system.

Manual reset feature

The red alarm signal lamp 15 may be provided with a manual reset feature, if desired. A conductor is provided between the contact terminal 134 and ground with a normally closed switch 135 interposed. The normally closed switch 135 has a switch-arm 22 corresponding to the manual reset button 22 shown in FIGURE 2. When the SCR 128 fires (as above described) the switch arm 130 engages the contact terminal 134, thereby providing a closed circuit through the switch 135, the contact terminal 134, the relay arm 130, the red alarm signal lamp 15, the relay coil 132 to the power supply terminal 47. The coil 132 will remain energized and the switch arm 130 will remain in engagement with the contact terminal 134 until the circuit is broken by opening the switch 135, i.e., by depressing the manual reset switch arm 22.

Time delay

The detector filter capacitor 117 also provides a time delay by requiring a predetermined time to develop its full charge. Time delays of from 3 to 10 seconds are preferred. Accordingly the actual rotor vibrations must exceed the preselected maximum level for a minimum period in order for the monitor device to provide an alarm signal indication. That is, the capacitor 117 is parallel with the detector load resistor 118; hence the full instantaneous potential across the terminals 93, 94 cannot be delivered to the detector load resistor 118 until the capacitor 117 has reached its corresponding charge. This time delay eliminates false alarms which might otherwise result from transient shocks which are unrelated to the performance of the rotating machinery under investigation.

Fail-safe circuitry

The purpose of the fail-safe circutry is to provide a continuing indication that the monitor device and its connections are properly operating. The fail-safe signal lamp 16, preferably green, is normally glowing to indicate normal operation. The fail-safe signal lamp 15 will flash intermittently to indicate abnormal operation such as:

(a) the machine under scrutiny has shut down;
(b) the monitor device itself has developed a defect or has an improper setting;
(c) the electromagnetic transducer or cable is defective.

The fail-safe circuitry is quite similar to the alarm circuitry. The input signal received from the terminals 93, 94 is coupled through capacitors 137a, 137b to a rectifier circuit which delivers a corresponding direct current voltage across the detector load resistor 142 and also across the detector filter capacitor 141. The capacitor 141 develops a potential which opposes the voltage across the lower portion of the voltage divider resistor 149. If the potential across terminals 93, 94 is diminished below a preselected level, the voltage sensing unijunction transistor 143 will commence oscillations and the charged capacitors 147, 148 will deliver a pulse through the Base-2 load resistor 145. That pulse moreover will fire the SCR 151, thereby closing the relay circuit which includes the SCR 151, the load limiting resistor 152, the capacitor 154 and the relay coil 153 in parallel, the contact terminal 157, the switch-arm 156 and the terminal 47. The relay circuit capacitor 154 develops a charge which is applied to the relay coil 153 to pull the switch-arm 156 away from engagement with the contact terminal 157, thereby interrupting the flow of current through the fail-safe signal lamp 16, to cause it to become extinguished. Simultaneously the relay coil 153 is de-energized and the switch arm 156 returns to its normal engagement with the contact terminal 157. If the train of pulses continues to exist in the Base-2 load resistor 145, the SCR 151 will again be fired and the fail-safe signal lamp 16 will continue to flash intermittently. The delay capacitor 154 in one embodiment requires about 100 milli-seconds to develop a charge of 6 volts which is needed to energize the relay coil 153 to move the switch-arm 156.

*Available information*

The signal lamps may be presented in the following combinations:

|  | GREEN LAMP 16 FAIL-SAFE | RED LAMP 15 ALARM |
| --- | --- | --- |
| 1 | OFF | OFF. |
| 2 | GLOW | OFF. |
| 3 | GLOW | FLASHING. |
| 4 | GLOW | GLOW. |
| 5 | FLASHING | OFF. |

Condition 1—occurs when the monitor device is disconnected from its power source—or—when the green lamp 16 is burned out.

Condition 2—is normal operating condition, i.e., the rotating machiney is operating, the vibration level is below the alarm threshold.

Condition 3—occurs only when the device is provided with the automatic reset feature. This condition requires that the rotating machinery continuously manifest vibrations in excess of the alarm threshold level.

Condition 4—occurs only where the monitor device is provided with a manual reset feature. Here the rotating machinery has (since the last reset operation) manifested excessive vibrations for a period exceeding the critical delay period.

Condition 5—indicates that the monitor device is operating properly but that there is some difficulty in the transducer, cable connections or in the rotating machinery itself. Condition 5 also can be developed when the alarm set range knob 20 is improperly set. To explain: when the desired alarm threshold level is 0.7 mil, the alarm set knob 21 would be set at the "7" indication and the range set knob 20 would be set at "1" (meaning a full-scale deflection of the meter 17 is 1 mil). In this situation, the red alarm signal lamp 15 will be lighted only after the actual vibrations have exceeded 0.7 mil displacement. The green signal lamp 16 will be normally glowing and will flash only when the vibrations diminish below a preselected fraction of the full scale displacement level (preferably about 5 percent). Thus the green signal lamp 16 will flash only when the vibrations fall below $$0.05 \times 1.0 = 0.050 \text{ mils}$$

or 50 micro-inches.

Thus a normal vibration level in excess of 50 micro-inches is needed to maintain the green lamp 16 in a glowing condition. If, through inadvertence or intent, the range control knob 20 should be advanced to the "10" indication, the full scale vibration level would be 10 mils and an indicated vibration level of 500 micro-inches would be needed to maintain the green lamp 16 in a glowing condition. Hence the green lamp 16 would commence flashing when the range control knob 20 is set too high.

Similarly, when the range control knob 20 is set too low, the red lamp 15 will commence glowing or flashing, thereby giving a seemingly incorrect indication.

However, this deliberate improper setting feature provides a ready mechanism for determining whether the alarm lamp 15 is usable or burnt-out.

*Use as a vibration meter*

The present device can be utilized as an emergency vibration meter by observing the indications on the meter 17 and applying the multiplier-factor to which the range selector knob 20 is set.

In the absence of the meter 17, the device also may be used as an emergency vibration meter by turning the alarm set knob 21 from high to low values gradually until the red alarm lamp 15 commences to glow or flash. Then by raising the alarm set knob 21 to a very slightly higher value, the point of incipient flashing (or glowing) of the alarm lamp 15 can be determined and can be considered as an approximate indication of the existing vibration amplitude.

The use of the present device for such purposes is not recommended because of the inability of the device to distinguish the vibration frequencies, i.e., the device does not contain a frequency filter.

*General*

The vibration monitor device 13 of FIGURE 1 is shown as a permanent installation in association with the machine 10. It should also be apparent that the present vibration monitor apparatus can be utilized by an operator who moves through a machine shop containing numerous machines. A table of allowable vibration (or critical vibrations) levels for each individual machine can be prepared. The operator, carrying the present monitor device 13, the cable 14 and the electromagnetic transducer 12, moves through the shop periodically and sets the knobs 20, 21 according to the vibration levels of the prepared table for each machine. Then by engaging the transducer 12 with the appropriate machine, the condition of vibration can be determined for every machine in the shop. The satisfactory vibration levels can be maintained even where the operator has no comprehension of the nature of vibration problems. The operator need only set both knobs 20, 21 and observe and record whether the green lamp 16 and red lamp 15 are flashing, glowing or extinguished when the transducer is brought into engagement with each machine. Thus one of the present vibration monitor devices can be used to monitor an entire machine shop.

We claim:

1. A compact vibration monitor for continuously observing mechanical vibrations of rotating machinery comprising:

a pair of input terminals;

voltage generating means adapted to generate at said input terminals an oscillatory input signal corresponding in amplitude to the amplitude of the said mechanical vibrations;

a first signal lamp being normally extinguished and a second signal lamp being normally ignited;

a pair of signal channels connected between said input terminals and the respective first and second signal lamps;

the signal channel connected between said input terminals and the said first signal lamp including (a) circuit means responsive to the said input voltage for continuously comparing the said input voltage with a first comparison voltage; (b) circuit means responsive to said input voltage in excess of said first comparison voltage for igniting said first signal lamp for a predetermined period of ignition; and (c) circuit means for extinguishing said first signal lamp after it has been ignited for the said period of ignition;

the other of said signal channels including means for rectifying the said oscillatory input signal;

a capacitor charged by current passing through said rectifying means;

a normally non-conducting unijunction transistor coupled to said capacitor;

means for causing said unijunction transistor to produce an oscillatory output signal when the voltage falls below a predetermined magnitude;

a normally energized signal lamp;

and means including a silicon-controlled rectifier coupled to the unijunction transistor for periodically deenergizing said signal lamp when oscillations are produced by the unijunction transistor.

2. A compact vibration monitor for continuously observing mechanical vibrations of rotating machinery comprising:

voltage generating means in contact with said rotating machinery for generating an oscillatory signal corresponding in amplitude to the instantaneous velocity of said mechanical vibrations;

integrating means coupled to the voltage generating means for integrating said oscillatory signal;

a plurality of signal channels coupled to the output of said integrating means;

one of said channels incorporating circuitry for indicating when the integrated output of said integrating means exceeds a first predetermined magnitude indicative of an excessive vibration condition of the vibrating machinery;

another of said channels incorporating circuitry for indicating when the output of said integrating means falls below a second predetermined magnitude indicative of a failure of either said voltage generating means or said integrating means;

the last-named indicating circuitry comprising rectifying means for rectifying the output of said integrating means;

a capacitor charged by current passing through said rectifying means;

a normally non-conducting unijunction transistor coupled to said capacitor;

means for causing said unijunction transistor to produce an oscillatory output signal when the voltage across said capacitor falls below a predetermined magnitude;

a normally energized signal lamp;

and means including a silicon-controlled rectifier coupled to the unijunction transistor for periodically deenergizing said signal lamp when oscillations are produced by the unijunction transistor.

3. A compact vibration monitor for continuously observing mechanical vibrations of rotating machinery comprising:

voltage generating means in contact with said rotating machinery for generating an oscillatory signal corresponding in amplitude to the instantaneous velocity of said mechanical vibrations;

integrating means coupled to the voltage generating means for integrating said oscillatory signal;

a first and second signal lamp;

a pair of signal channels connected between said integrating means and the respective signal lamps;

a first unijunction transistor in one of said channels capable of producing an oscillatory signal;

means including a time delay capacitor for actuating said first unijunction transistor to produce an oscillatory signal when the integrated output of said integrating means exceeds a first predetermined magnitude for a period of time determined by the time delay of said capacitor;

means including a first silicon-controlled rectifier responsive to the oscillatory signal produced by the first unijunction transistor in said one channel for periodically energizing said first signal lamp;

rectifying means in the other of said signal channels for rectifying the integrated output of said integrating means;

a capacitor connected to the output of said rectifying means and chargeable by current flowing through the rectifying means;

a second unijunction transistor capable of producing oscillations and coupled to the capacitor in said other channel whereby the second unijunction transistor in said other channel will be caused to produce oscillations when the voltage across said last-named capacitor falls below a predetermined magnitude;

means in said other channel for normally continually energizing said second signal lamp;

and means including a second silicon-controlled rectifier in said other channel operable in response to oscillations produced by said second unijunction transistor for periodically deenergizing said second signal lamp to indicate the voltage across said capacitor in the other channel as being below a predetermined voltage level.

References Cited by the Examiner

UNITED STATES PATENTS

| | | | |
|---|---|---|---|
| 2,426,209 | 8/47 | Hartley | 340—172 |
| 2,566,426 | 9/51 | Parks | 340—172 |
| 2,633,741 | 4/53 | Sanders | 73—71.4 |
| 2,699,465 | 1/55 | Hamilton | 340—261 |
| 2,709,913 | 6/55 | Church | 340—261 |
| 2,740,108 | 3/56 | Plympton et al. | 340—263 |
| 2,796,600 | 6/57 | Church | 340—261 |
| 2,799,015 | 7/57 | Bell | 340—261 |
| 2,832,915 | 4/58 | McCoy | 340—261 |
| 2,963,693 | 12/60 | Capalozza | 340—261 |
| 2,983,912 | 5/61 | Ghersi | 340—276 |
| 3,049,699 | 8/62 | Larrick et al. | 340—261 |
| 3,095,730 | 7/63 | Matheson | 73—67 |

NEIL C. READ, *Primary Examiner.*